United States Patent
Burchett et al.

(10) Patent No.: US 11,143,273 B2
(45) Date of Patent: Oct. 12, 2021

(54) STRAIGHT-SIDED RADIAL FLANK ARCHITECTURE

(71) Applicant: Allison Transmission, Inc., Indianapolis, IN (US)

(72) Inventors: Douglas S. Burchett, Martinsville, IN (US); Rick Platt, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 172 days.

(21) Appl. No.: 16/287,398

(22) Filed: Feb. 27, 2019

(65) Prior Publication Data
US 2019/0264781 A1 Aug. 29, 2019

Related U.S. Application Data

(60) Provisional application No. 62/636,544, filed on Feb. 28, 2018.

(51) Int. Cl.
*F16H 3/66* (2006.01)

(52) U.S. Cl.
CPC ......... *F16H 3/66* (2013.01); *F16H 2200/203* (2013.01)

(58) Field of Classification Search
CPC .. F16H 57/08; F16H 57/082; F16H 2057/087; Y10T 403/7045; F16D 1/00; F16D 1/02
See application file for complete search history.

(56) References Cited

U.S. PATENT DOCUMENTS

| | | | |
|---|---|---|---|
| 889,786 A * | 6/1908 | Keiner | H01R 13/6395 439/371 |
| 3,191,453 A * | 6/1965 | Hoven | F16D 1/116 74/432 |

(Continued)

FOREIGN PATENT DOCUMENTS

| | | | | |
|---|---|---|---|---|
| DE | 102015214112 A1 * | 2/2017 | | F16H 57/08 |
| DE | 102015216672 A1 * | 3/2017 | | F16H 57/082 |

(Continued)

OTHER PUBLICATIONS

"Design Practice for Automotive Driveline Splines and Serrations," SAE Paper No. 680009, Cameron et al., updated 1991, 20 pages.

*Primary Examiner* — Sherry L Estremsky
(74) *Attorney, Agent, or Firm* — Faegre Drinker Biddle & Reath LLP

(57) ABSTRACT

A transmission coupling assembly for transferring torque in a transmission from a first rotatable component to a second rotatable component and a method of assembling a transmission coupling assembly are disclosed. The transmission coupling assembly may comprise a first operative transmission component interconnected with a second operative transmission component. The first and second operative transmission components may each include a body adapted to be coupled to a respective one of the first and second rotatable components and a plurality of engagement features extending from the body along an axis of the respective operative transmission components. The plurality of engagement features are configured to intermesh during assembly of the transmission coupling assembly. The transmission coupling assembly may include a retainer received and positioned within recesses of the respective plurality of (Continued)

engagement features and compressed by a beveled surface of one of the plurality of engagement features during assembly.

21 Claims, 12 Drawing Sheets

(56) References Cited

U.S. PATENT DOCUMENTS

| | | | | |
|---|---|---|---|---|
| 3,370,832 | A * | 2/1968 | Spyridakis | F16H 1/2836 |
| | | | | 254/344 |
| 4,008,629 | A * | 2/1977 | Hoepfl | F16H 57/08 |
| | | | | 475/331 |
| 4,039,233 | A * | 8/1977 | Schmidt | F16C 13/006 |
| | | | | 384/510 |
| 4,382,495 | A | 5/1983 | Fleitas | |
| 4,966,264 | A * | 10/1990 | Hayakawa | F16H 57/08 |
| | | | | 192/109 R |
| 5,232,411 | A * | 8/1993 | Hayashi | F16H 3/66 |
| | | | | 192/48.611 |
| 5,690,577 | A * | 11/1997 | Enzmann | B25B 23/14 |
| | | | | 384/571 |
| 5,794,752 | A * | 8/1998 | Baer | F16D 23/146 |
| | | | | 192/85.52 |
| 6,223,872 | B1 | 5/2001 | Heller et al. | |
| 6,669,570 | B2 * | 12/2003 | Krude | F16D 1/076 |
| | | | | 464/157 |
| 8,156,867 | B2 * | 4/2012 | Stimpson | F42B 15/36 |
| | | | | 102/377 |
| 8,167,762 | B2 | 5/2012 | Zink et al. | |
| 10,151,382 | B2 * | 12/2018 | Lemke | F16H 57/082 |
| 2006/0287152 | A1 * | 12/2006 | Bishop | F16H 57/0482 |
| | | | | 475/159 |
| 2016/0356341 | A1 | 12/2016 | Flemming et al. | |
| 2017/0241485 | A1 | 8/2017 | Piper et al. | |

FOREIGN PATENT DOCUMENTS

| | | | | |
|---|---|---|---|---|
| DE | 102017112331 A1 | * | 12/2018 | F16H 57/082 |
| WO | WO-2018224087 | * | 12/2018 | |

* cited by examiner

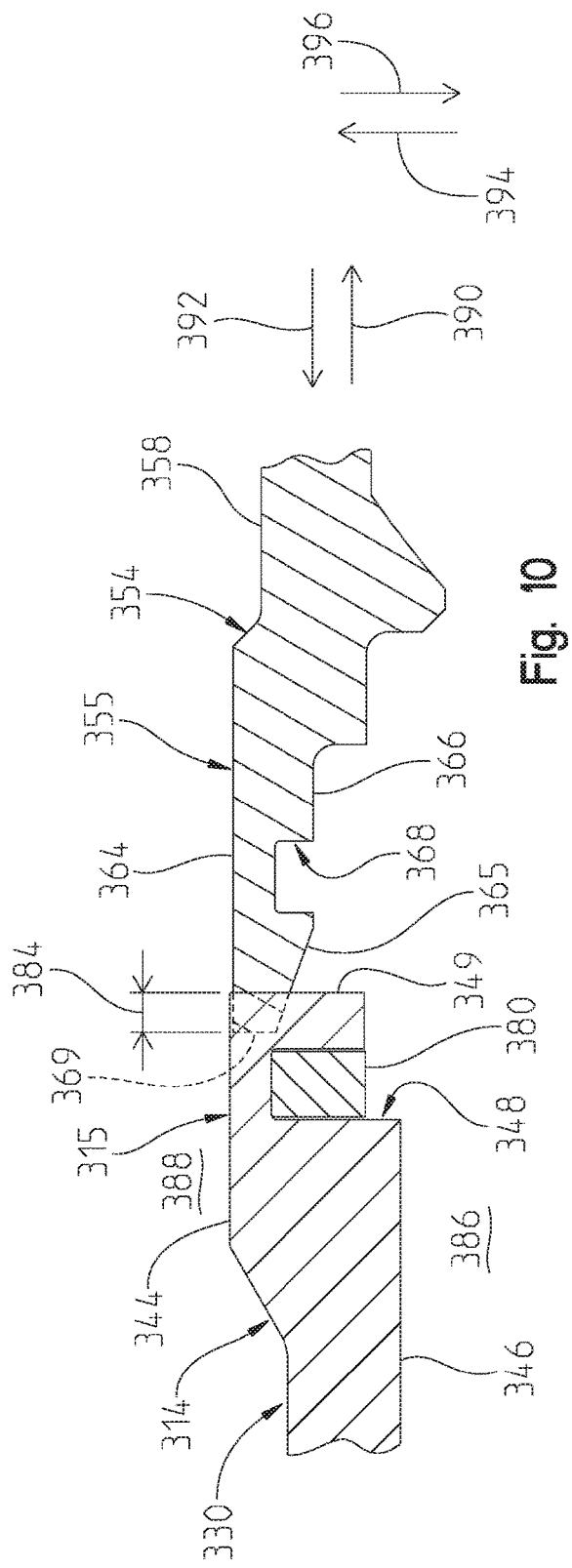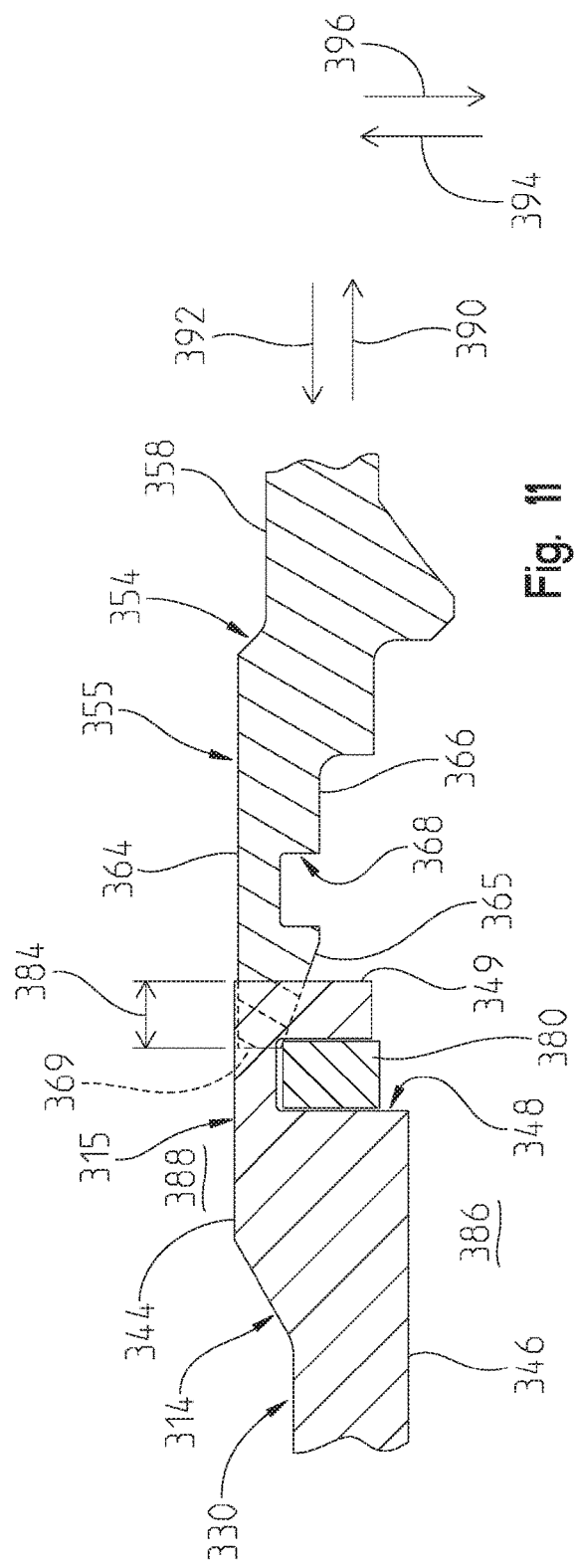

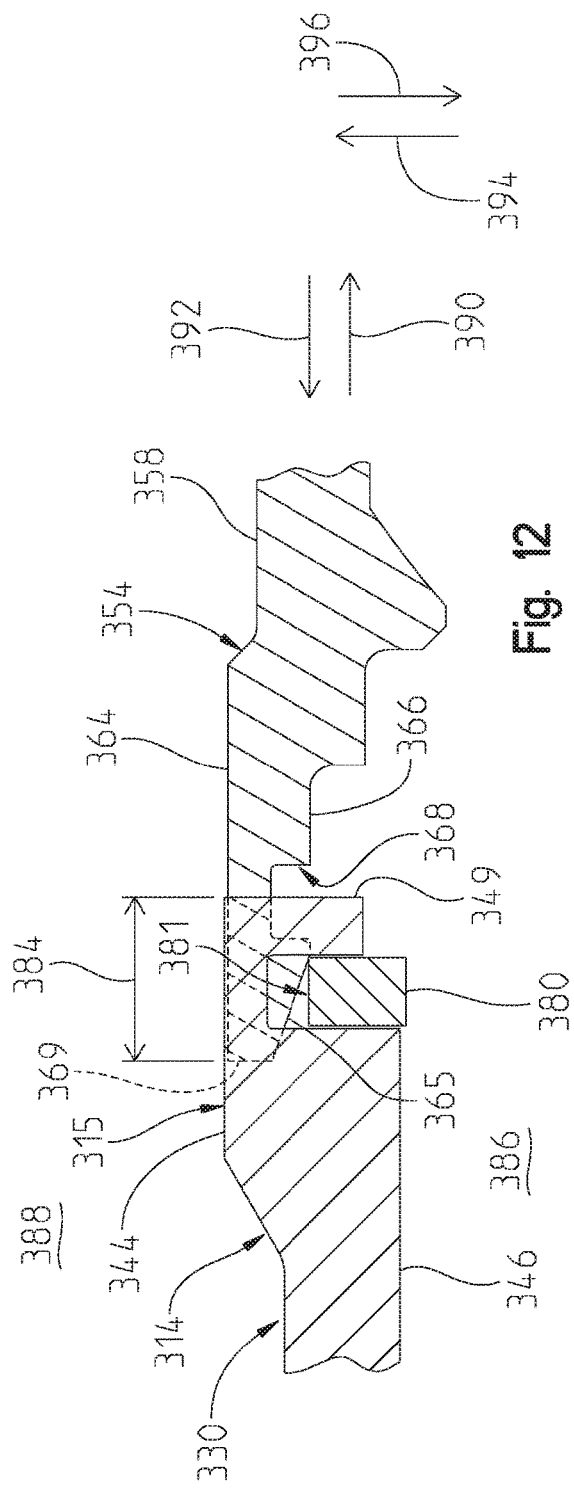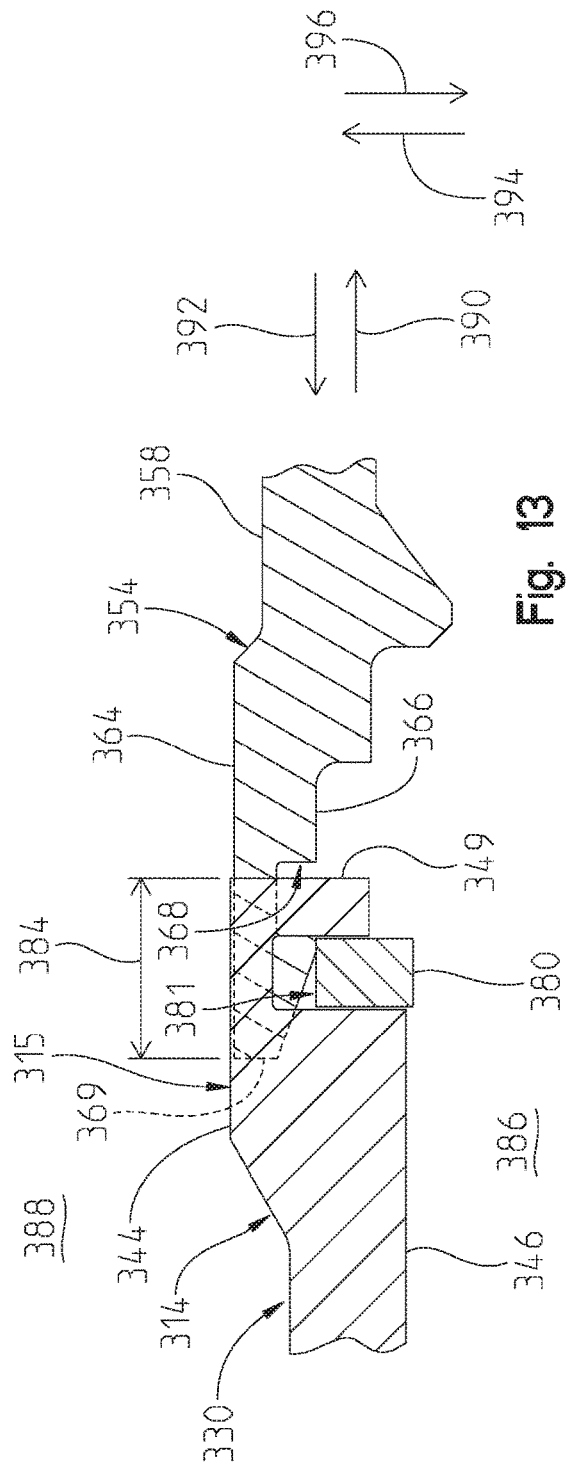

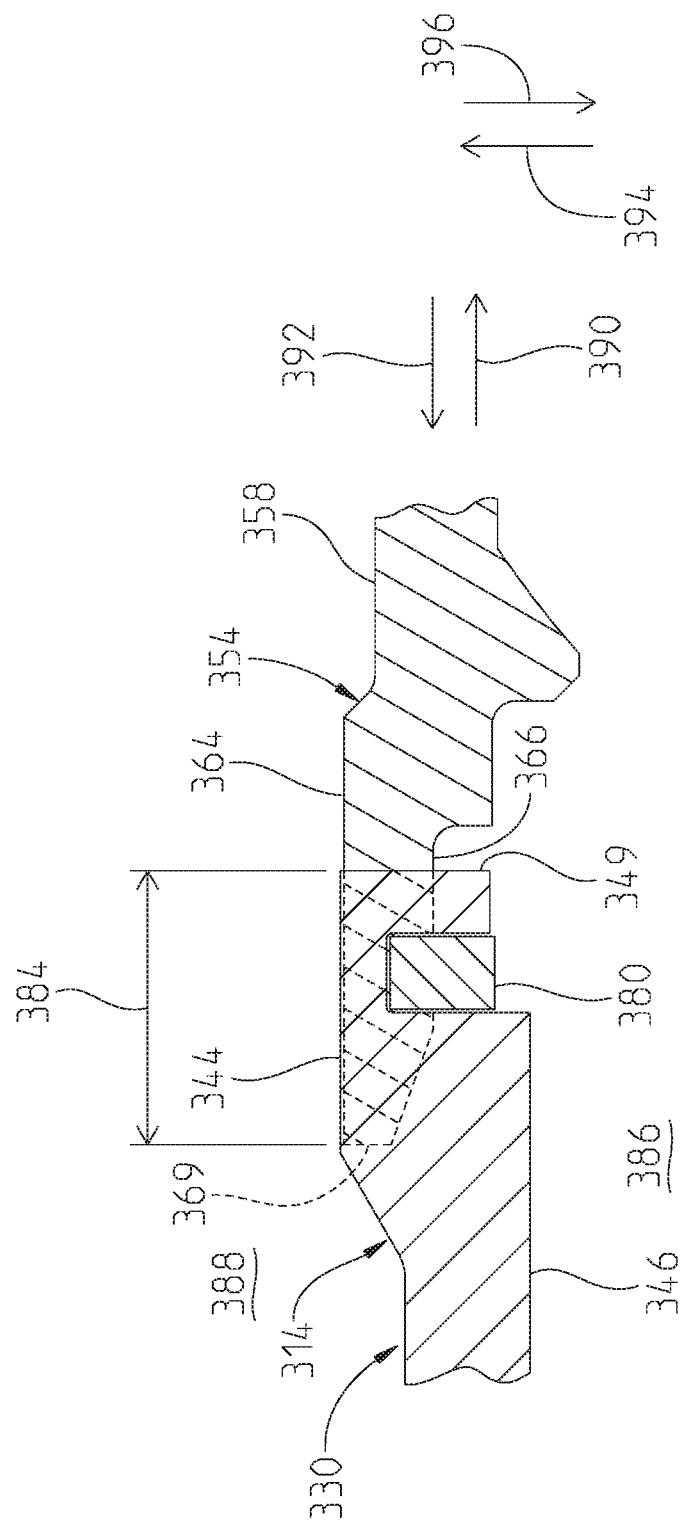

STRAIGHT-SIDED RADIAL FLANK ARCHITECTURE

CROSS-REFERENCE TO RELATED APPLICATIONS

This application claims the benefit of U.S. Provisional Application No. 62/636,544, filed Feb. 28, 2018, the entire disclosure of which is hereby expressly incorporated herein by reference.

FIELD OF THE DISCLOSURE

The present disclosure relates to a torque transfer coupling assembly and in particular to a transmission coupling assembly for transferring torque and rotational motion in a multi-speed transmission between rotatable components.

BACKGROUND OF THE DISCLOSURE

Known multi-speed transmissions use a plurality of planetary gearsets and a plurality of interconnectors and operative transmission components to achieve a plurality of forward and reverse speed ratios between an input member and an output member operatively connected to the multi-speed transmission. During operation, torque and rotational motion are operatively transferred from the input member to the output member through the operative transmission components of the multi-speed transmission. In order to facilitate the transfer of torque and rotational motion, a transmission coupling assembly couples operative transmission components of the multi-speed transmission.

SUMMARY OF THE DISCLOSURE

In an exemplary embodiment of the present disclosure, a transmission coupling assembly for transferring torque in a transmission from a first rotatable component to a second rotatable component is provided. The transmission coupling assembly comprises a first operative transmission component and a second operative transmission component. The first operative transmission component is configured to rotate about an axis and includes a first body adapted to be coupled to the first rotatable component. The first operative transmission component further includes a first engagement end defined by a first plurality of engagement features extending from the first body along and spaced apart from the axis. Each of the first plurality of engagement features has a first radial exterior surface and a first radial interior surface opposite the first radial exterior surface. The first radial interior surface is positioned radially between the first radial exterior surface and the axis. The second operative transmission component is configured to rotate about the axis and includes a second body adapted to be coupled to the second rotatable component and a second engagement end. The second engagement end is defined by a second plurality of engagement features extending from the second body along and spaced apart from the axis. Each of the second plurality of engagement features has a second radial exterior surface and a second radial interior surface opposite the second radial exterior surface. The second radial interior surface is positioned radially between the second radial exterior surface and the axis. The second operative transmission component is operatively coupled to the first operative transmission component through an intermeshing of the second plurality of engagement features with the first plurality of engagement features. When intermeshed, at least a first portion of the first radial exterior surface of each of the first plurality of engagement features positioned proximate the second body of the second operative transmission component and at least a second portion of the second radial exterior surface of each of the second plurality of engagement features positioned proximate the first body of the first operative transmission component are accessible along a radial direction.

In a first example, the transmission coupling assembly further comprises a retainer that holds the first operative transmission component axially relative to the second operative transmission component. A zone of engagement is defined by an axial overlap of the first plurality of engagement features with the second plurality of engagement features when intermeshed. The retainer engages the first operative transmission component and the second operative transmission component in the zone of engagement. In a second example, the first plurality of engagement features and the second plurality of engagement features comprise straight-sided radial flank architecture.

In another exemplary embodiment of the present disclosure, a method of assembling a transmission coupling assembly for transferring torque in a transmission from a first rotatable component to a second rotatable component is provided. The method comprises the step of providing a first operative transmission component and a second operative transmission component. The first operative transmission component is configured to rotate about an axis and includes a first body adapted to be coupled to the first rotatable component and a first engagement end defined by a first plurality of engagement features. The first plurality of engagement features extend from the first body along and spaced apart from the axis. Each of the first plurality of engagement features includes a first radial exterior surface and a first radial interior surface opposite the first radial exterior surface. The first radial interior surface is positioned between the first radial exterior surface and the axis. The first radial interior surface has a first recess. The second operative transmission component is configured to rotate about the axis and includes a second body adapted to be coupled to the second rotatable component and a second engagement end defined by a second plurality of engagement features. The second plurality of engagement features extend from the second body along and spaced apart from the axis. Each of the second plurality of engagement features have a second radial exterior surface and a second radial interior surface opposite and non-intersecting with the second radial exterior surface. The second radial interior surface is positioned radially between the second radial exterior surface and the axis. Each of the second plurality of engagement features further has a beveled surface positioned radially between the second radial exterior surface and second radial interior surface. The second radial interior surface has a second recess and the beveled surface is arranged longitudinally of the second recess along the axis.

The method further comprises the step of placing a discontinuous annular retainer within the first recess. The method also comprises the step of placing the second engagement end of the second operative transmission component adjacent the first engagement end of the first operative transmission component. The method further comprises the step of aligning the second plurality of engagement features with the first plurality of engagement features, wherein the second plurality of engagement feature are capable of intermeshing with the first plurality of engagement features when aligned. The method also comprises the step of applying a force along the axis to at least one of the first body of the first operative transmission component or the second body of the second operative transmission component along the axis such that the beveled surface of the second operative transmission component engages the discontinuous annular retainer. When the force is applied, the discontinuous annular retainer deforms. The force is applied until the first recess and the second recess are aligned and the discontinuous annular retainer reforms and is received and positioned within the first recess and the second recess.

In a further exemplary embodiment of the present disclosure, an operative transmission component for transferring torque is provided. The operative transmission component comprises a body rotatable about a longitudinal axis and a plurality of engagement features adjacent and extending from a first end of the body along the longitudinal axis. Each of the plurality of engagement features includes a radial exterior surface and a radial interior surface opposite and non-intersecting with the radial exterior surface. The radial interior surface is positioned radially between the radial exterior surface and the longitudinal axis. Each of the plurality of engagement features further include a beveled surface intersecting one of the radial exterior surface or the radial interior surface. In one example, the beveled surface intersects the radial interior surface. In another example, each of the plurality of engagement features includes a recess. Each recess is configured to receive a portion of an annular retainer. In a variation of this example, the radial interior surface of each of the plurality of engagement features includes the recess. The recess is positioned longitudinally from the beveled surface along the longitudinal axis.

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 10 is a partial cross-sectional view illustrating a first engagement feature of a first operative transmission component aligned and intermeshing with a second engagement feature of a second operative transmission component of the transmission coupling assembly of FIG. 3;

FIG. 11 is a partial cross-sectional view illustrating a beveled surface of the second engagement feature of the second operative transmission component engaging a retainer supported in a first recess of the first engagement feature of the first operative transmission component;

FIG. 12 is a partial cross-sectional view illustrating the beveled surface of the second engagement feature fully engaging and compressing the retainer;

FIG. 13 is a partial cross-sectional view illustrating the retainer compressed and positioned intermediate the beveled surface and a second recess of the second engagement feature; and FIG. 14 is a partial cross-sectional view illustrating the retainer uncompressed and positioned within the first recess of the first engagement feature and the second recess of the second engagement feature.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
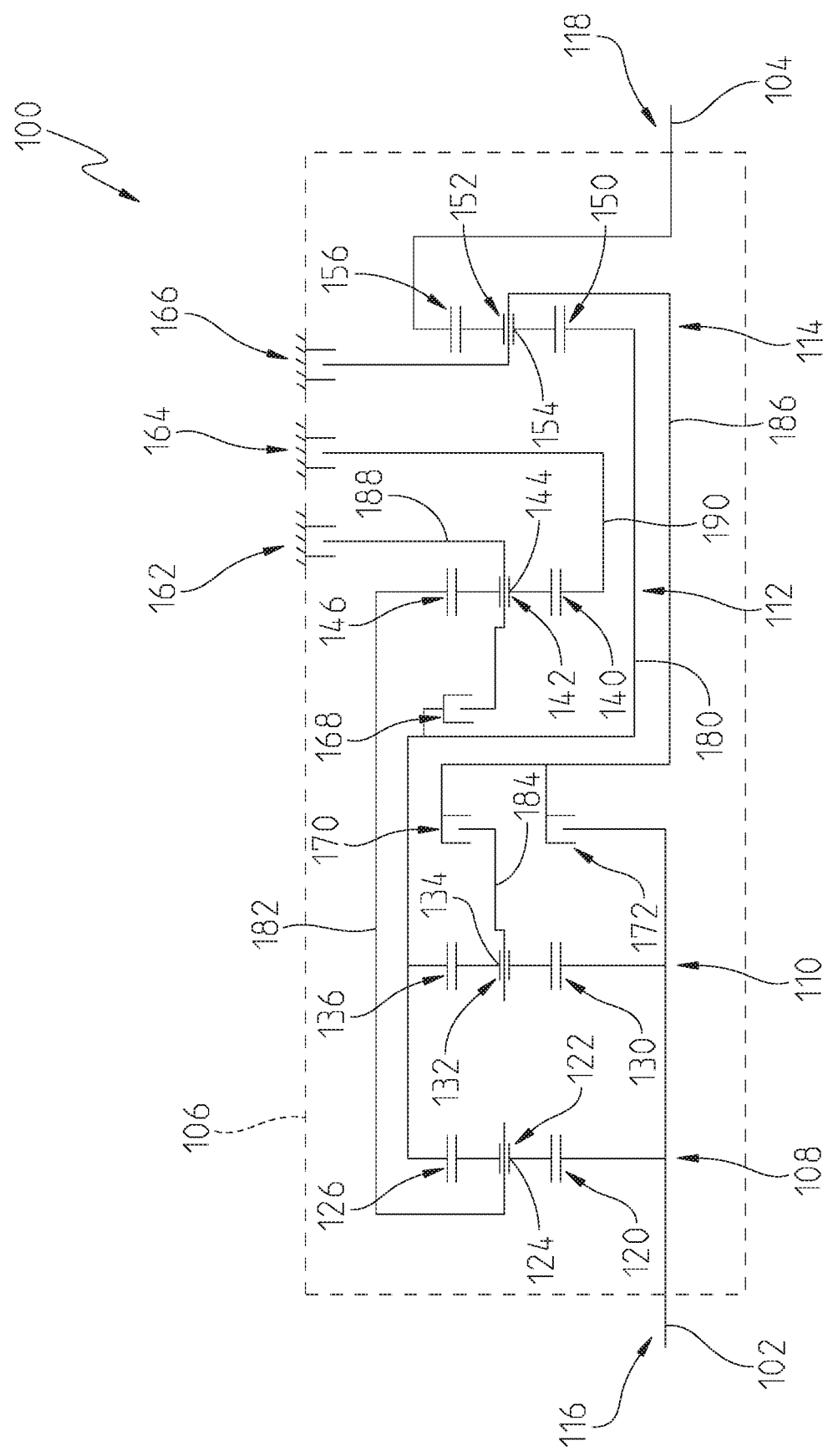
FIG. 1 is a diagrammatic view of an exemplary multi-speed transmission including four planetary gearsets, six selective couplers, and eight interconnectors.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In the exemplary transmission embodiment, torque and rotational motion are transferred from an input member to an output member through a multi-speed transmission. In order to facilitate the transfer of torque and rotational motion to the output member at different selected gear ratios, the multi-speed transmission includes a plurality of operative transmission components. Simply put, an operative transmission component is a device or component that carries torque and rotational motion within the transmission. Operative transmission components illustratively include brakes, clutches, interconnectors, sun gears, planet carriers, and ring gears.

A clutch is an example of a selective coupler. A clutch couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A second exemplary selective coupler is a brake. A brake couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in U.S. Pat. No. 9,625,007, the entirety of which is incorporated by reference.

In addition to coupling through selective couplers, various components of the disclosed transmission embodiments may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

Interconnectors include one or more rotating components, such as shafts, drums, and other components fixedly coupled together. Interconnectors may further be fixedly coupled to one or more other operative transmission components.

FIG. 1 is a diagrammatic representation of an exemplary multi-speed transmission 100. Multi-speed transmission 100 includes an input member 102 and an output member 104. Each of input member 102 and output member 104 is rotatable relative to at least one stationary member 106. An exemplary input member 102 is an input shaft or other suitable rotatable component. Input member 102 is rotated by a prime mover. Exemplary prime movers include internal combustion engines, electric motors, hybrid power systems, and other suitable power systems. In one embodiment, the prime mover indirectly rotates the input member through a clutch and/or a torque converter. An exemplary output member 104 is an output shaft or other suitable rotatable component. Output member 104 provides rotational power to one or more working components. Exemplary working components include one or more drive wheels of a motor vehicle, a power take-off shaft, and other suitable devices. Output member 104 is rotated based on the interconnections of the operative transmission components of the transmission 100. By changing the interconnections of the operative transmission components, a rotation speed of output member 104 may be varied from a rotation speed of input member 102. An exemplary stationary member 106 is a housing of multi-speed transmission 100. The housing may include several components coupled together. In the exemplary embodiment shown in FIG. 1, input member 102 enters stationary member 106 at a first location or end 116 and output member 104 exits stationary member 106 at a second location or end 118.

Multi-speed transmission 100 includes at least one planetary gearset. In the exemplary embodiment of FIG. 1, multi-speed transmission 100 includes a plurality of planetary gearsets, illustratively a first planetary gearset 108, a second planetary gearset 110, a third planetary gearset 112, and a fourth planetary gearset 114. In another embodiment, additional planetary gearsets may be included. Further, although first planetary gearset 108, second planetary gearset 110, third planetary gearset 112, and fourth planetary gearset 114 are illustrated as simple planetary gearsets, it is contemplated that compound planetary gearsets may be included in some embodiments. Additionally, the arrangement of the plurality of planetary gearsets is exemplary. The engagement features discussed herein may be used to establish one or more of the fixed connections of the multi-speed transmission 100. The engagement features are not limited to use with the multi-speed transmission of FIG. 1, but rather may be implemented in other transmission configurations to establish the fixed connections.

First planetary gearset 108 includes a sun gear 120, a planet carrier 122 supporting a plurality of planet gears 124, and a ring gear 126. Second planetary gearset 110 includes a sun gear 130, a planet carrier 132 supporting a plurality of planet gears 134, and a ring gear 136. Third planetary gearset 112 includes a sun gear 140, a planet carrier 142 supporting a plurality of planet gears 144, and a ring gear 146. Fourth planetary gearset 114 includes a sun gear 150, a planet carrier 152 supporting a plurality of planet gears 154, and a ring gear 156.

Multi-speed transmission 100 further includes a plurality of selective couplers, illustratively a first selective coupler 162, a second selective coupler 164, a third selective coupler 166, a fourth selective coupler 168, a fifth selective coupler 170, and a sixth selective coupler 172. In the illustrated embodiment, first selective coupler 162, second selective coupler 164, and third selective coupler 166 are brakes and fourth selective coupler 168, fifth selective coupler 170, and sixth selective coupler 172 are clutches. The axial locations of the clutches and brakes relative to the plurality of planetary gearsets may be altered from the illustrated axial locations. In alternative embodiments, any number of clutches and brakes may be used.

Multi-speed transmission 100 includes several components that are illustratively shown as being fixedly coupled together. Input member 102 is fixedly coupled to sun gear 120 of first planetary gearset 108 and sun gear 130 of second planetary gearset 110. Output member 104 is fixedly coupled to ring gear 156 of fourth planetary gearset 114. Ring gear 126 of first planetary gearset 108, ring gear 136 of second planetary gearset 110, and sun gear 150 of fourth planetary gearset 114 are fixedly coupled together. Planet carrier 122 of first planetary gearset 108 is fixedly coupled to ring gear 146 of third planetary gearset 112. In alternative embodiments, one or more of the components fixedly coupled together are selectively coupled together through one or more selective couplers.

Multi-speed transmission 100 may be described as having eight interconnectors. Input member 102 is a first interconnector that both provides input torque and rotational motion to multi-speed transmission 100 and fixedly couples sun gear 120 of first planetary gearset 108 to sun gear 130 of second planetary gearset 110. Input member 102 is further fixedly coupled to sixth selective coupler 172. Output member 104 is a second interconnector that provides output torque and rotational motion from multi-speed transmission 100. A third interconnector 180 fixedly couples ring gear 126 of first planetary gearset 108, ring gear 136 of second planetary gearset 110, and sun gear 150 of fourth planetary gearset 114 together. Third interconnector 180 is further fixedly coupled to fourth selective coupler 168. A fourth interconnector 182 fixedly couples planet carrier 122 of first planetary gearset 108 to ring gear 146 of third planetary gearset 112. A fifth interconnector 184 fixedly couples planet carrier 132 of second planetary gearset 110 to fifth selective coupler 170. A sixth interconnector 186 fixedly couples planet carrier 152 of fourth planetary gearset 114, third selective coupler 166, fifth selective coupler 170, and sixth selective coupler 172 together. A seventh interconnector 188 fixedly couples planet carrier 142 of third planetary gearset 112 to first selective coupler 162 and to fourth selective coupler 168. An eighth interconnector 190 fixedly couples sun gear 140 of third planetary gearset 112 to second selective coupler 164. Each interconnector may include multiple components that are fixedly coupled together, such as through the engagement features disclosed herein.

Multi-speed transmission 100 further includes several components that are illustratively shown as being selectively coupled together through selective couplers. By engaging various combinations of first selective coupler 162, second selective coupler 164, third selective coupler 166, fourth selective coupler 168, fifth selective coupler 170, and sixth selective coupler 172, additional components of multi-speed transmission 100 may be fixedly coupled together. Thus, the plurality of planetary gearsets and the plurality of selective couplers of multi-speed transmission 100 may be interconnected in various arrangements to provide torque and rotational motion from input member 102 to output member 104 in a plurality of forward gear or speed ratios and reverse gear or speed ratios. FIG. 1 is a representative view of an exemplary transmission. Additional details regarding the exemplary transmission are disclosed in U.S. patent application Ser. No. 15/483,027, the entirety of which is incorporated by reference.

Figure 2:
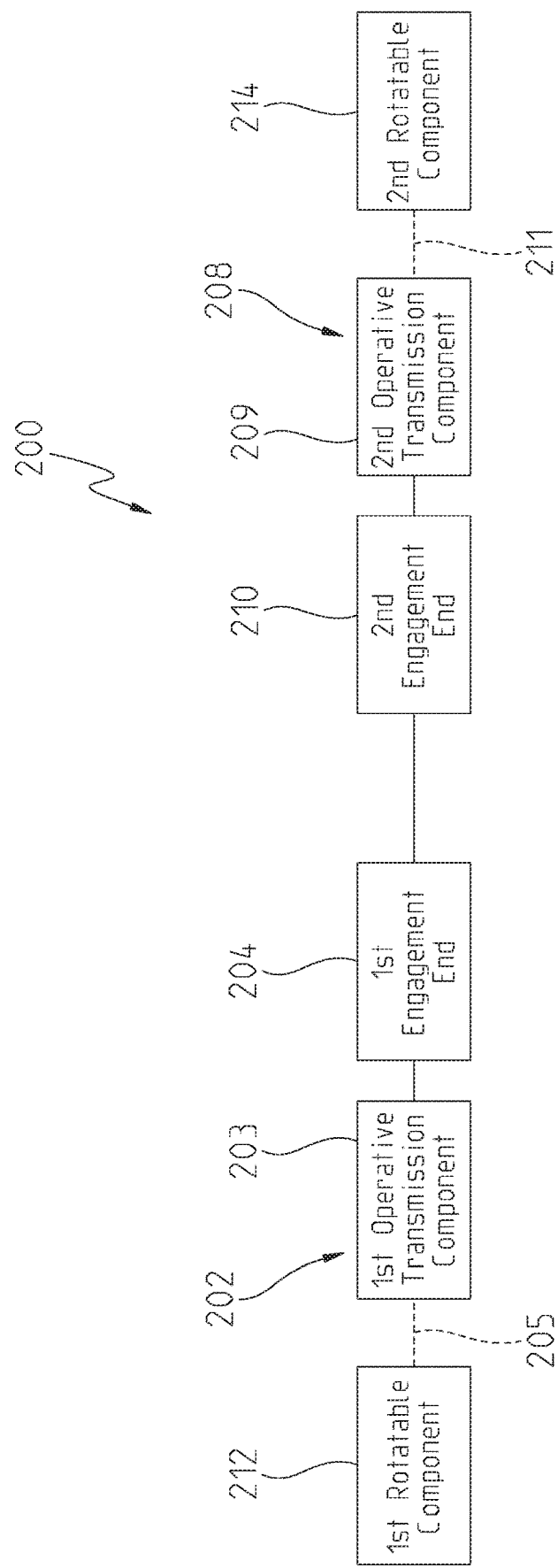
FIG. 2 is a diagrammatic view of an exemplary transmission coupling assembly.
Figure 3:
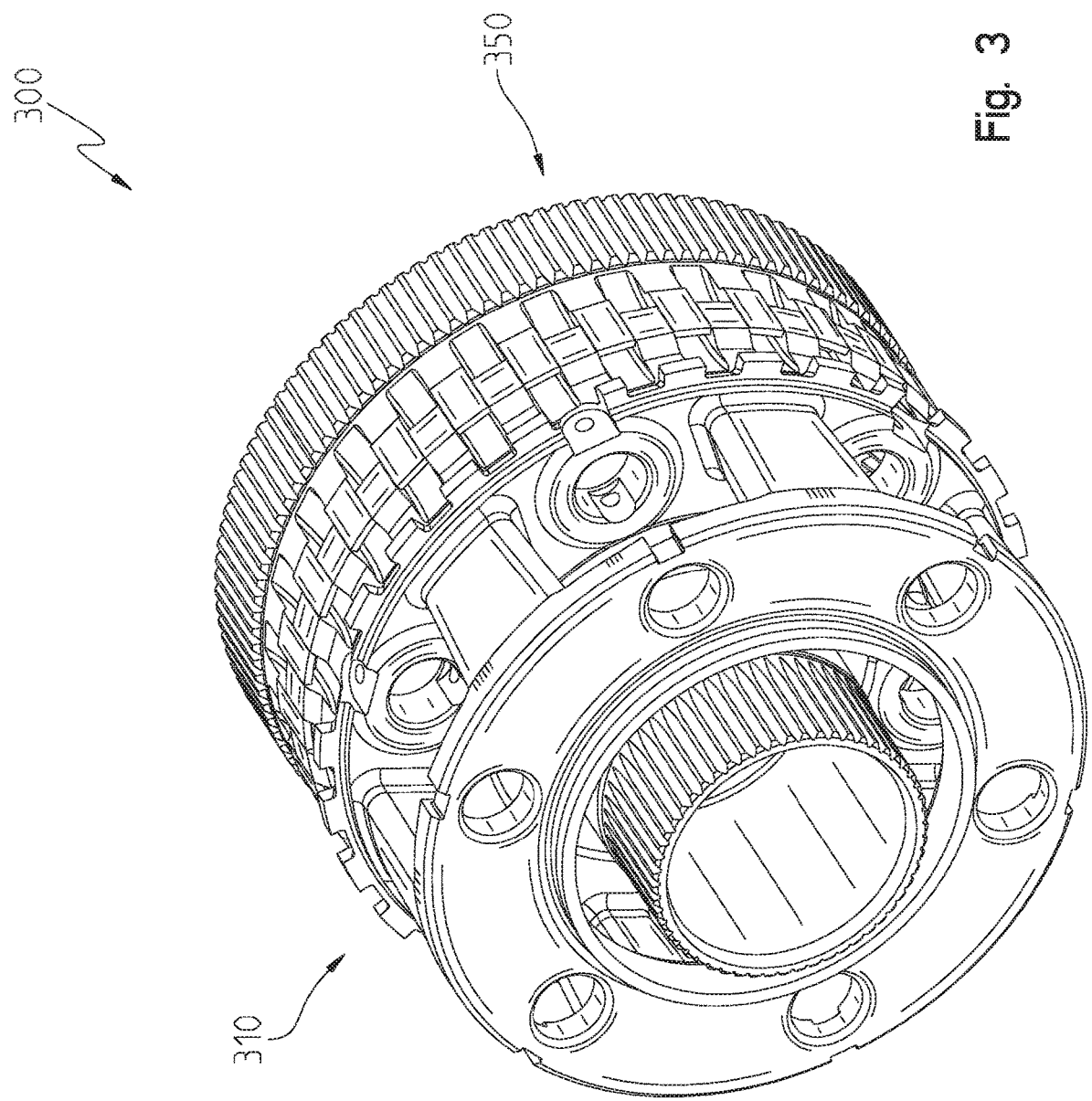
FIG. 3 is a perspective front view of another exemplary transmission coupling assembly.
Figure 4:
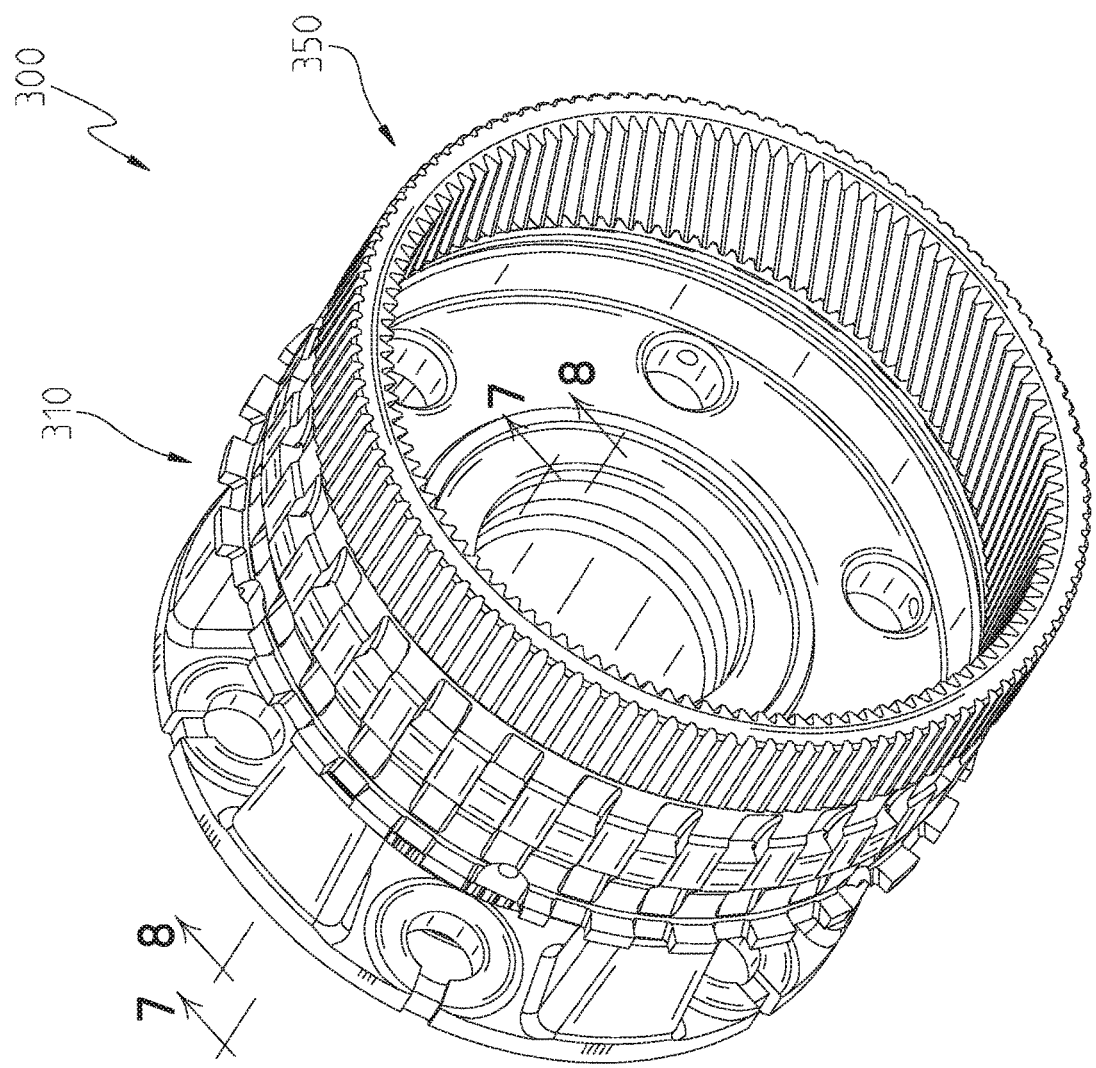
FIG. 4 is a perspective rear view of the exemplary transmission coupling assembly of FIG. 3.

FIG. 2 is a diagrammatic view of a transmission coupling assembly 200 comprising a first operative transmission component 202 coupled to a second operative transmission component 208. Transmission coupling assembly 200 facilitates the transfer of torque and rotational motion from a first rotatable component 212 to a second rotatable component 214. More specifically, transmission coupling assembly 200 facilitates the transfer of torque and rotational motion between first operative transmission component 202 and second operative transmission component 208. As discussed above in connection with FIG. 1, an operative transmission component may comprise a brake, a clutch, an interconnector, a sun gear, a planet carrier, or a ring gear. Similarly, a rotatable component may comprise a rotatable portion of a brake, a clutch, an interconnector, a sun gear, a planet carrier, a ring gear, an input member, or an output member.

In the exemplary embodiment of FIG. 2, first operative transmission component 202 includes a body 203 adapted to be coupled to first rotatable component 212. First operative transmission component 202 illustratively further includes a first engagement end 204. Second operative transmission component 208 includes a body 209 adapted to be coupled to second rotatable component 214. Second operative transmission component 208 illustratively further includes a second engagement end 210. In one example, one or both of first engagement end 204 and second engagement end 210 are integral portions of body 203 and body 209, respectively. In another example, one or both of first engagement end 204 and second engagement end 210 are fixedly coupled to body 203 and body 209, respectively. In FIG. 2, first engagement end 204 is engaged with second engagement end 210 and fixedly couples first operative transmission component 202 to second operative transmission component 208. In this way, torque and rotational motion applied to and carried by first operative transmission component 202 may be transferred to second operative transmission component 208 through the engagement of first engagement end 204 with second engagement end 210.

While shown as distinct from first and second operative transmission components 202, 208 in FIG. 2, it is contemplated that first engagement end 204 and second engagement end 210 are integrally formed with bodies 203, 209 of first and second operative transmission components 202, 208, respectively. For example, first engagement end 204 may be integrally formed with body 203 of first operative transmission component 202 while second engagement end 210 may be integrally formed with body 209 of second operative transmission component 208. Further, one or more of first operative transmission component 202 and second operative transmission component 208 may function as a rotatable component.

Body 203 of first operative transmission component 202 is adapted to be coupled to first rotatable component 212 at a connection 205. Similarly, body 209 of second operative transmission component 208 is adapted to be coupled to second rotatable component 214 at a connection 211. Connections 205, 211 of FIG. 2 are illustrated in broken or dashed lines to emphasize that first operative transmission component 202 and second operative transmission component 208 may be adapted to directly or indirectly couple to first rotatable component 212 and second rotatable component 214, respectively. For example, first rotatable component 212 may comprise an input member and first operative transmission component 202 may comprise a clutch. In this first example, a body (diagrammatically body 203) of the clutch (diagrammatically first operative transmission component 202) may be adapted to couple directly to the input member (diagrammatically first rotatable component 212). In another example, first rotatable component 212 may comprise an input member and first operative transmission component 202 may comprise a planet carrier of a planetary gearset. In this second example, the planet carrier may be indirectly coupled to the input member through an intermediate structure or other operative transmission component. Thus, a body (diagrammatically body 203) of the planet carrier (diagrammatically first operative transmission component 202) may be adapted to couple indirectly to the input member (diagrammatically first rotatable component 212). In fact in a variation of this example, the planet carrier may itself be a part of another transmission coupling assembly, for example, where the planet carrier is coupled to a clutch that is in turn coupled to the input member. Accordingly, successive or linked transmission coupling assemblies are contemplated.

Referring now to FIGS. 3-6, an exemplary transmission coupling assembly 300 comprising a planet carrier 310 engaged with a ring gear 350 is illustrated. As discussed above in connection with FIG. 1, both planet carrier 310 and ring gear 350 are an operative transmission component. In the illustrative embodiment of FIGS. 3-6, each of planet carrier 310 and ring gear 350 comprises a generally cylindrical shape and is configured to rotate about a longitudinal axis 302 (see FIGS. 5 and 6). Planet carrier 310 includes an engagement end 312 defined by a plurality of engagement features 314. Similarly, ring gear 350 includes an engagement end 352 defined by a plurality of engagement features 354. When planet carrier 310 and ring gear 350 are engaged to form transmission coupling assembly 300, engagement features 314 of planet carrier 310 are intermeshed and engaged with engagement features 354 of ring gear 350 such that the torque and relative motion carried by planet carrier 310 may be transferred to ring gear 350.

Planet carrier 310 comprises a front cheek 320 coupled to a rear cheek 330. Front cheek 320 comprises a plate 322 having a first side 321 and a second side 323 opposite first side 321. Plate 322 is adapted to rotate about longitudinal axis 302. Front cheek 320 further comprises a plurality of posts 324 coupled with second side 323 of plate 322 and a central opening 326 intersected by longitudinal axis 302.

Plate 322 of front cheek 320 further includes a plurality of apertures 328 circumferentially spaced about central opening 326. Central opening 326 and each of apertures 328 form a passageway from first side 321 to second side 323 of plate 322. In the exemplary embodiment of FIGS. 3-6, apertures 328 are equally and circumferentially spaced about central opening 326. Additionally, each of apertures 328 is positioned intermediate adjacent ones of posts 324. That is, each of apertures 328 is positioned between a first one and a second one of posts 324.

In the exemplary embodiment of FIGS. 3-6, each of posts 324 of front cheek 320 is integrally formed with the second side 323 of plate 322. Each of posts 324 comprises a generally polygonal transverse cross section (see FIGS. 5 and 6). In an alternative embodiment, front cheek 320 is laser or friction welded to the rear cheek 330 where each one of plurality of posts 324 abuts rear cheek 330. In the exemplary embodiment shown in FIGS. 3-6, posts 324 are circumferentially spaced about central opening 326.

Rear cheek 330 of planet carrier 310 comprises a plate 332 having a first side 331 and a second side 333 opposite first side 331. Plate 332 is configured to rotate about longitudinal axis 302. Rear cheek 330 further comprises a shaft 334 coupled to first side 331 of plate 332. Shaft 334 is integrally formed with first side 331 of plate 332 and is intersected by longitudinal axis 302. In an alternative embodiment, shaft 334 is removably coupled with first side 331 of plate 332. In the exemplary embodiment of FIGS. 3-6, shaft 334 extends from first side 331 of plate 332 along longitudinal axis 302 through central opening 326 of front cheek 320. Shaft 334 includes an exterior surface 335 and an inner surface 336 defining a hollow interior.

Shaft 334 is adapted to couple planet carrier 310 to an input member, output member, or another operative transmission component. In the exemplary embodiment of FIGS. 3-6, exterior surface 335 of shaft 334 includes an engagement portion 340 defined by a plurality of engagement features 341, illustratively splines 342. Engagement features 341 are positioned on a distal portion of shaft 334 in the exemplary embodiment of FIGS. 3-6. In an alternative embodiment, engagement features 341 extend along the entire longitudinal extent of shaft 334. In another alternative embodiment, inner surface 336 of shaft 334 includes a plurality of engagement features. In variations of this alternative embodiment, the engagement features are positioned on a distal portion shaft 334 or extend along the entire longitudinal extent of shaft 334.

In the illustrated embodiment, rear cheek 330 of planet carrier 310 further comprises a plurality of apertures 338 circumferentially spaced about longitudinal axis 302. Each of apertures 338 forms a passageway from first side 331 to second side 333 of plate 332. In the exemplary embodiment shown in FIGS. 3-6, apertures 338 are spaced equally and circumferentially about shaft 334. In addition, each of apertures 338 is coaxial with a respective one of apertures 328 of plate 322 of front cheek 320.

In the exemplary embodiment of FIGS. 3-6, plate 332 of rear cheek 330 further includes a plurality of raised abutments 344 circumferentially spaced about longitudinal axis 302. Each of raised abutments 344 comprise a generally polygonal cross section and are configured to abut a distal portion of a respective one of posts 324 of front cheek 320. In the exemplary embodiment of FIGS. 3-6, each of raised abutments 344 is positioned intermediate adjacent ones of apertures 338 of plate 332. That is, each of raised abutments 344 is positioned between a first one and a second one of apertures 338.

Figure 6:
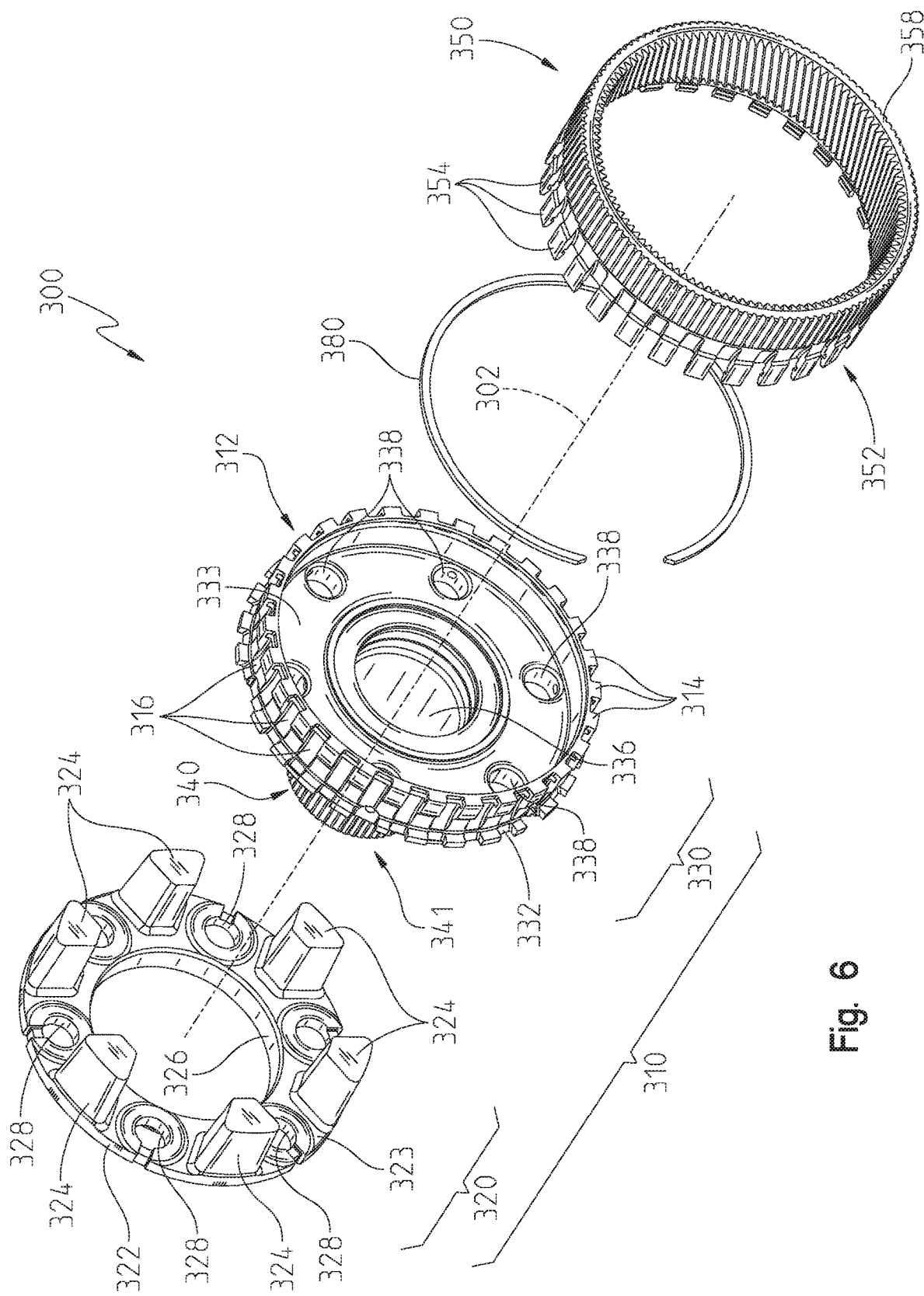
FIG. 6 is an exploded assembly view of the exemplary transmission coupling assembly of FIG. 4.
Figure 7:
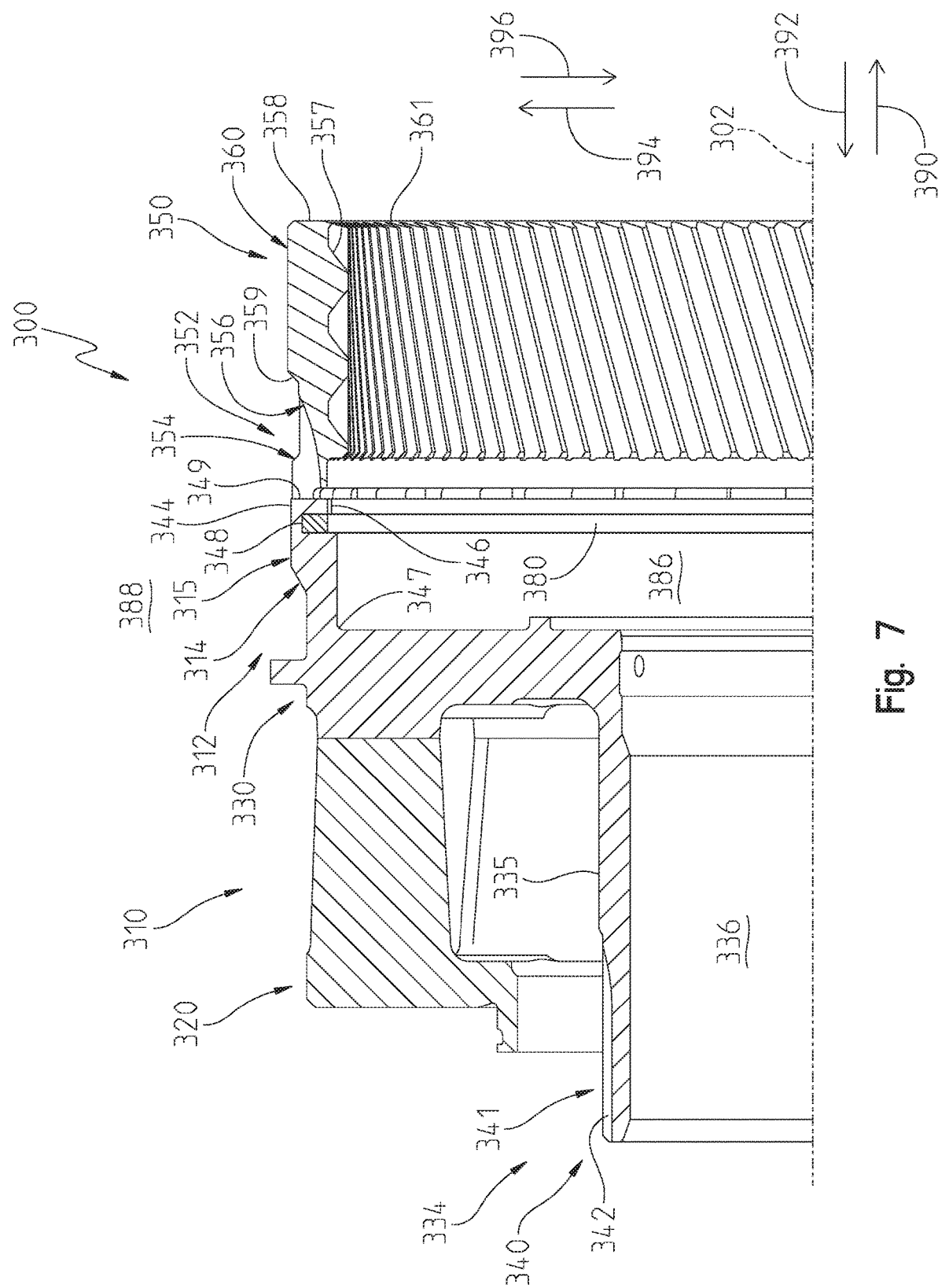
FIG. 7 is a partial cross-sectional view taken along line 7-7 of FIG. 4.
Figure 8:
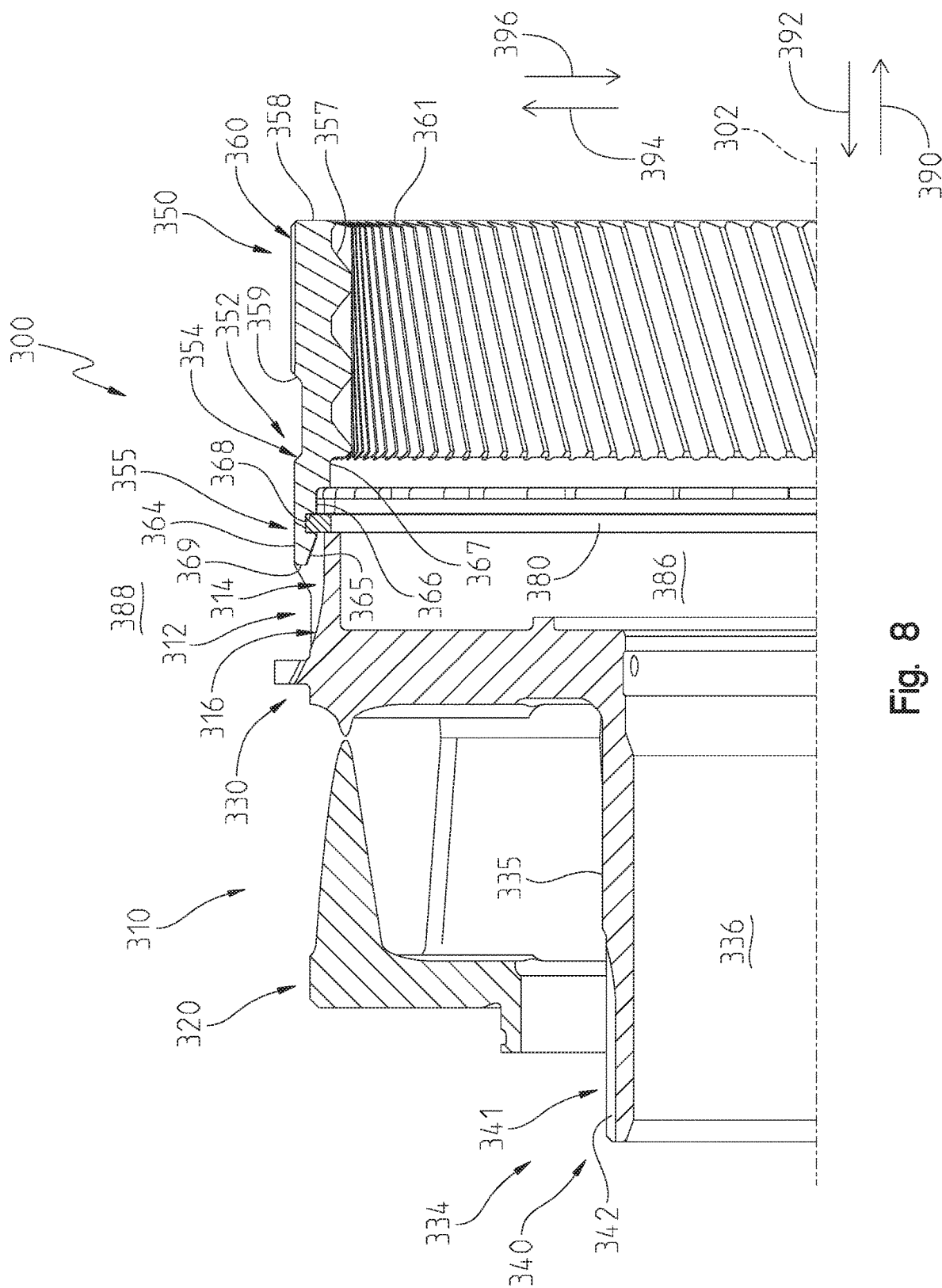
FIG. 8 is a partial cross-sectional view taken along line 8-8 of FIG. 4.

As shown in FIGS. 6-8, engagement end 312 of planet carrier 310 is adjacent second side 333 of rear cheek 330. Engagement features 314 illustratively extend from second side 333 of rear cheek 330 along and spaced apart from longitudinal axis 302. In this way, engagement features 314 project outwardly from second side 333 of rear cheek 330. More specifically, engagement features 314 have a longitudinal extent 315 that extends parallel to longitudinal axis 302. In the exemplary embodiment shown, engagement features 314 are circumferentially and equally spaced about longitudinal axis 302.

Turning now to FIG. 7, each of engagement features 314 includes a radial exterior surface 344 and a radial interior surface 346 opposite and non-intersecting with radial exterior surface 344. Additionally, radial interior surface 346 is positioned radially between radial exterior surface 344 and longitudinal axis 302. That is, radial interior surface 346 is positioned radially closer to longitudinal axis 302 along a radial direction 396 than radial exterior surface 344. In addition, radial interior surface 346 of each of engagement features 314 includes a recess 348 sized and configured to receive and support a portion of a retainer 380. Recess 348 is positioned axially intermediate a distal portion 349, or tip, and a base 347, or root, of each of engagement features 314. In the exemplary embodiment of FIG. 7, recess 348 is positioned nearer distal portion 349 than base 347 of each of engagement features 314. In addition, recess 348 illustratively has a generally rectangular transverse cross section.

Referring now to FIGS. 7 and 8, ring gear 350 comprises an outer frame 358 having a generally cylindrical shape and a hollow central portion intersected by longitudinal axis 302. Outer frame 358 includes an outer side 359 and an inner side 357 opposite outer side 359. Outer frame 358 is adapted to couple ring gear 350 to an input member, output member, or other operative transmission component. In the illustrated embodiment, outer side 359 of outer frame 358 includes a plurality of straight splines 360. In addition, inner side 357 of outer frame 358 includes a plurality of helical teeth 361. Each of straight splines 360 and helical teeth 361 permit ring gear 350 to transfer torque and rotational motion to an input or output member or another operative transmission component.

Engagement end 352 of ring gear 350 is longitudinally opposite straight splines 360 along longitudinal axis 302. Engagement features 354 extend from outer frame 358 along and spaced apart from longitudinal axis 302. In this way, engagement features 354 project outwardly from engagement end 352. More specifically, engagement features 354 have a longitudinal extent 355 that extends parallel to longitudinal axis 302. In the exemplary embodiment shown, engagement features 354 are spaced circumferentially and equally about longitudinal axis 302.

Turning now to FIG. 8, each of engagement features 354 illustratively includes a radial exterior surface 364 and a radial interior surface 366 opposite and non-intersecting with radial exterior surface 364. Additionally, radial interior surface 366 is positioned radially between radial exterior surface 364 and longitudinal axis 302. That is, radial interior surface 366 is positioned radially closer to longitudinal axis 302 along radial direction 396 than radial exterior surface 364.

In the illustrated embodiment, each of engagement features 354 further includes a beveled surface 365 positioned between radial exterior surface 364 and radial interior surface 366. In the exemplary embodiment of FIG. 8, beveled surface 365 is angled with respect to and intersects radial exterior surface 364 such that radial exterior surface 364 extends axially further along longitudinal axis 302 relative to radial interior surface 366. In another embodiment, beveled surface 365 is angled with respect to and intersects radial exterior surface 364 such that radial interior surface 366 extends axially further along longitudinal axis 302 relative to radial exterior surface 364. In an alternative embodiment, beveled surface 365 is a rounded surface.

Radial interior surface 366 of each of engagement features 354 includes a recess 368 sized and configured to receive and support a portion of retainer 380. In an alternative embodiment, radial exterior surface 364 of each of engagement features 354 includes a recess configured to receive a portion of retainer 380. In the exemplary embodiment of FIG. 8, recess 368 is positioned axially nearer beveled surface 365 than base 367 of each of engagement features 354. In an alternative embodiment, recess 368 is positioned axially intermediate beveled surface 365 and a base 367, or root, of each of engagement features 354. In another alternative embodiment, recess 368 is positioned axially intermediate beveled surface 365 and base 367 and beveled surface 365 is positioned axially intermediate recess 368 and a distal portion 369, or tip, of each of engagement features 354. In the embodiment shown, recess 368 illustratively has a generally rectangular transverse cross section.

In the exemplary embodiment of FIGS. 3-8, engagement features 314, 354 comprise cut teeth that are capable of intermeshing with one another. In the illustrated embodiment, the architecture of each of engagement features 314, 354 is a straight-sided radial flank architecture explained in more detail in connection with FIG. 9.

Figure 9:
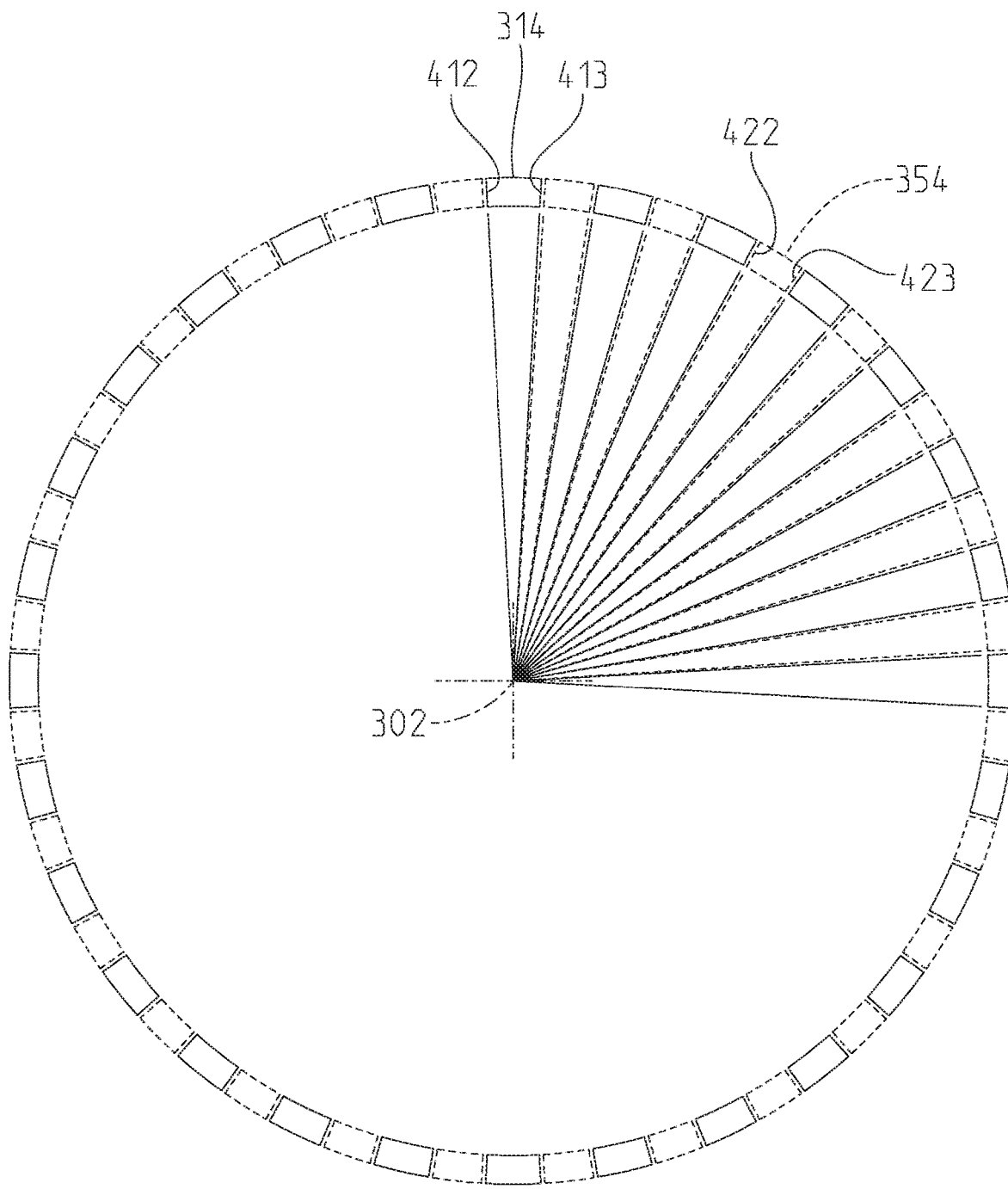
FIG. 9 is a diagrammatic view of a spline assembly comprising intermeshed engagement features having straight-sided radial flank architecture.

FIG. 9 illustrates engagement features 314, 354 intermeshed in a straight-sided radial flank architecture. In a straight-sided radial flank architecture, each of engagement features 314, 354 includes side surfaces, illustratively flanks 412, 413 and flanks 422, 423, respectively, which define planes that generally pass through longitudinal axis 302. As illustrated in FIG. 9, engagement features 314, 354 include twenty-eight pairs of intermeshed members. The minimum number of pairs of intermeshed components is largely based on the contact stress to which the gear teeth will be exposed with a lower limit of two pairs of intermeshed gear teeth.

An advantage, among others, of engagement features 314, 354 having a straight-sided radial flank architecture is a larger contact surface of the respective side surfaces of engagement features 314, 354 which results in improved load sharing between the intermeshed members. Additionally, a straight-sided radial flank architecture minimizes backlash between the intermeshed members of engagement features 314, 354 and eliminates the corner loading that occurs because of backlash. Another advantage, among others, is that paired intermeshed members of engagement features 314, 354 self-align during assembly. While spacing is shown between intermeshing members of FIG. 9, this spacing exists to clearly illustrate the orientation of flanks 412, 413, 422, 423 of the straight-sided radial flank architecture relative to longitudinal axis 302. While some spacing between intermeshing members may be expected because of the tolerances in the machining process used to form intermeshing members, too much space may introduce excessive backlash.

The straight-sided radial flank architecture of intermeshing members may be formed from a variety of machining processes known in the arts. For example, a straight-sided radial flank architecture may be generated or machined using milling, scudding, hobbing, and grinding. In a preferred embodiment, the straight-sided radial flank architecture of intermeshed members is sized and shaped to be generated by hobbing with a hob machine known in the art for cutting gear teeth. That is, the straight-sided radial flank architecture of intermeshed members is formed by a rotating hob.

In the exemplary embodiment of FIGS. 3-8, engagement ends 312, 352 include a plurality of scalloped recesses 316, 356 radially alternating with engagement features 314, 354. Scalloped recesses 316, 356 are formed by the hob machine as the rotating hob exits a radially outer surface of engagement ends 312, 352 during generation of engagement features 314, 354. Each of scalloped recesses 316, 356 extends axially away from respective engagement features 314, 354 along longitudinal axis 302. More specifically, scalloped recesses 316 include a bottom surface extending axially in a direction 392, as illustrated in the exemplary embodiment of FIG. 8. In addition, the bottom surface of scalloped recesses 316 curves away from longitudinal axis 302 in radial direction 396 as the bottom surface extends axially in direction 392. Similarly, scalloped recesses 356 include a bottom surface extending axially in a direction 390, as illustrated in the exemplary embodiment of FIG. 7. Bottom surface of scalloped recesses 356 curves away from longitudinal axis 302 in radial direction 396 as the bottom surface extends axially in direction 390. In the illustrated embodiment, the curved extent of scalloped recesses 316, 356 mirrors an outer radius of curvature of the rotating hob. In addition, the radial and axial extent of scalloped recesses 316, 356 are sized and configured so that engagement features 314, 354 can intermesh during assembly.

Figure 5:
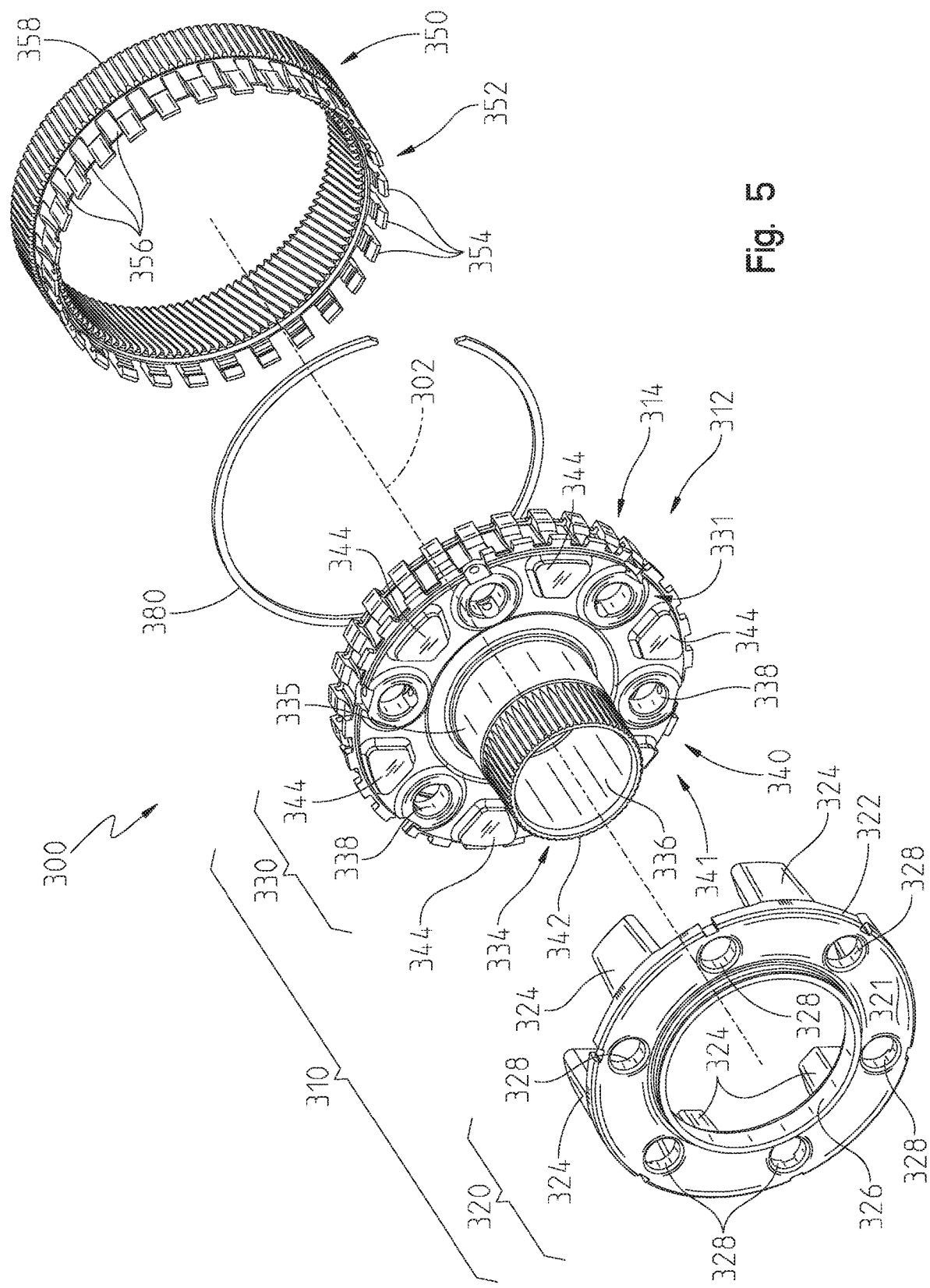
FIG. 5 is an exploded assembly view of the exemplary transmission coupling assembly of FIG. 3.

Referring now to FIGS. 5 and 6, transmission coupling assembly 300 further comprises retainer 380. Retainer 380 is configured to cooperate with planet carrier 310 and ring gear 350 to axially restrain or hold planet carrier 310 along the longitudinal axis 302 relative to ring gear 350. In the illustrated embodiment, retainer 380 comprises a discontinuous annular retainer, such as an interior snap ring. The discontinuity may be a gap or break in the annular retainer structure such that annular retainer 380 elastically deforms under a sufficient compressive force. That is, the sufficient compressive force elastically reduces an outer dimension of annular retainer 380. In the absence of the compressive force, retainer 380 will elastically increase in dimension. As shown in FIGS. 7-13, retainer 380 illustratively comprises a generally rectangular transverse cross section. An alternative retainer may be implemented including bands, snap features, fasteners, interlocking features on the intermeshing members of engagement features 314, 354, and other suitable retainers.

As further shown in FIGS. 7-13, retainer 380 is received and positioned within recesses 348, 368. That is, when engagement features 314 of planet carrier 310 and engagement features 354 of ring gear 350 are intermeshed, an extent of engagement exists such that recess 348 is aligned with recess 368. Thus, when recess 348 is aligned with recess 368, retainer 380 is simultaneously received and positioned within each of recesses 348, 368. Retainer 380 axially restrains or holds planet carrier 310 relative to ring gear 350. In this way, planet carrier 310 cannot axially separate from ring gear 350; thus, engagement features 314 of planet carrier 310 will remain intermeshed with engagement features 354 of ring gear 350.

Turning now to FIGS. 10-14, a progression of the intermeshing of engagement features 314 of planet carrier 310 with engagement features 354 of ring gear 350 during assembly of transmission coupling assembly 300 is shown. In the exemplary embodiment of FIGS. 10-14, retainer 380 is received and positioned within recess 348 of rear cheek 330 of planet carrier 310. In one embodiment, retainer 380 may be elastically deformed in order to be received by recess 348.

Engagement end 352 of ring gear 350 is placed adjacent engagement end 312 of rear cheek 330 of planet carrier 310. One or both of planet carrier 310 and ring gear 350 may be rotated about longitudinal axis 302 relative to the other in order to properly align engagement features 314 with engagement features 354. Engagement features 314 of planet carrier 310 are properly aligned with engagement features 354 of ring gear 350 when engagement features 314 are capable of intermeshing with engagement features 354 to operatively couple planet carrier 310 to ring gear 350.

An assembly force is applied axially along longitudinal axis 302 to one or both of planet carrier 310 and ring gear 350. If the assembly force is applied to planet carrier 310, then the assembly force is applied along longitudinal axis 302 in direction 390 and ring gear 350 may be held stationary relative to planet carrier 310. If the assembly force is applied to ring gear 350, then the assembly force is applied along longitudinal axis 302 in direction 392 and planet carrier 310 may be held stationary relative to ring gear 350. In another embodiment, an assembly force is applied to both planet carrier 310 and ring gear 350 in directions 390 and 392, respectively.

As shown in FIG. 10, an assembly force has been applied to at least one of planet carrier 310 and ring gear 350, and engagement features 314 have begun to intermesh with engagement features 354. An extent of the intermeshing of engagement features 314 with engagement features 354 is referred to as a zone of engagement 384. More specifically, an axial overlap of engagement features 314 with engagement features 354 defines zone of engagement 384. An axial overlap of engagement features 314 with engagement features 354 occurs when distal portion 349 of engagement features 314 is axially closer to outer frame 358 than distal portion 369 of engagement features 354 is to outer frame 358. Similarly, distal portion 369 of engagement features 354 is axially closer to rear cheek 330 than distal portion 349 of engagement features 314 is to rear cheek 330.

In the exemplary embodiments of FIGS. 10-14, zone of engagement 384 changes based upon the extent of the intermeshing and axial overlap of engagement features 314, 354. That is, the lesser the extent that engagement features 314, 354 intermesh and axially overlap, the narrower zone of engagement 384 will be. For example, zone of engagement 384 is narrow where engagement features 314 have just begun to intermesh and axially overlap with engagement features 354, as shown in FIG. 10. Conversely, the greater the extent that engagement features 314, 354 intermesh and axially overlap the wider zone of engagement 384 will be. For example, zone of engagement 384 is wide where engagement features 314 have intermeshed with engagement features 354 and are held together with retainer 380, as shown in FIG. 14, referred to herein as the assembled zone of engagement. Thus, significant correlation exists between zone of engagement 384 and axial overlap.

Because engagement features 314, 354 extend along longitudinal axis 302 from their respective operative transmission component, at least a portion of zone of engagement 384 is visible along a radial direction 394 when engagement features 314 of planet carrier 310 are intermeshed with engagement features 354 of ring gear 350. More specifically, when engagement features 314 of planet carrier 310 are intermeshed with engagement features 354 of ring gear 350, at least a portion of radial exterior surface 344 of each of engagement features 314 positioned proximate to outer frame 358 of ring gear 350 and at least a portion of radial exterior surface 364 of each of engagement features 354 positioned proximate rear cheek 330 of planet carrier 310 are accessible along radial direction 394. In the exemplary embodiment shown, this level of accessibility occurs throughout the intermeshing of engagement features 314, 354. In an alternative embodiment, this level of accessibility occurs in the assembled zone of engagement.

Additionally, at least a portion of radial interior surface 346 of each of engagement features 314 positioned proximate to outer frame 358 of ring gear 350 and at least a portion of radial interior surface 366 of each of engagement feature 354 positioned proximate rear cheek 330 of planet carrier 310 are accessible along radial direction 394 from longitudinal axis 302 to radial interior surface 346 and radial interior surface 366. In the exemplary embodiment shown, this level of accessibility occurs throughout the intermeshing of engagement features 314, 354. In an alternative embodiment, this level of accessibility occurs in the assembled zone of engagement.

In addition, at least a portion of radial interior surfaces 346, 366 is visible from an interior space 386 of transmission coupling assembly 300 when engagement features 314, 354 are intermeshed. In the exemplary embodiment of FIGS. 7 and 8, radial interior surface 346 between base 347 and distal portion 349 and radial interior surface 366 between base 367 and distal portion 369 are visible from interior space 386 and accessible along radial direction 394. In addition, at least a portion of exterior surfaces 344, 364 is visible from an exterior space 388 when engagement features 314, 354 are intermeshed. In the exemplary embodiment of FIGS. 7 and 8, radial exterior surface 344 between base 347 and distal portion 349 and radial exterior surface 364 between base 367 and distal portion 369 are visible from exterior space 388 and accessible along radial direction 394.

Referring back to the exemplary embodiment shown in FIG. 11, the assembly force has been applied to an extent that beveled surface 365 of engagement features 354 engages retainer 380 positioned within recess 348 of engagement features 314. As further shown in FIG. 11, engagement of retainer 380 by beveled surface 365 of engagement features 354 compresses retainer 380. Comparing FIGS. 10 and 11, a vertical position of retainer 380 has changed as retainer 380 is positioned lower in FIG. 11 as compared to the vertical position of retainer 380 in FIG. 10. As illustrated in FIG. 12, the more beveled surface 365 engages retainer 380, the more retainer 380 is compressed. For example, the vertical position of retainer 380 has changed when comparing FIGS. 10-12.

As illustrated in FIGS. 12 and 13, beveled surface 365 has fully engaged and compressed retainer 380. At this extent of engagement, an outer edge 381 of retainer 380 is approximately coplanar with radial interior surface 366 of engagement features 354, as shown in FIG. 13. Further application of the assembly force results in an advancement of retainer 380 along radial interior surface 366 in direction 390. When recess 348 aligns with recess 368, retainer 380, thus far elastically deformed, will reform and is received and positioned within recesses 348, 368, as shown in FIG. 14. When retainer 380 is simultaneously positioned within both recesses 348, 368, planet carrier 310 and ring gear 350 are axially restrained with respect to one another. More specifically, planet carrier 310 is prohibited from moving axially towards or away from ring gear 350. In the exemplary embodiment of FIGS. 10-14, retainer 380 engages planet carrier 310 and ring gear 350 in the assembled zone of engagement 384 of FIG. 14.

In summary, beveled surface 365 of ring gear 350 compresses retainer 380 such that engagement features 314 of planet carrier 310 and engagement features 354 of ring gear 350 are capable of intermeshing during assembly of the transmission coupling assembly 300. As a result, neither a separate assembly tool nor step is required to compress retainer 380 during assembly of transmission coupling assembly 300. Instead, ring gear 350 acts as its own assembly tool. Therefore, assembly of transmission coupling assembly 300 is simplified.

Similarly, the level of accessibility of radial interior surfaces 346, 366 along radial direction 394 from longitudinal axis 302 to the radial interior surface 346, 366 simplifies disassembly of transmission coupling assembly 300. More specifically, the level of accessibility means retainer 380 is accessible through interior space 386 of transmission coupling assembly 300, as illustrated in the exemplary embodiment of FIGS. 7 and 8. During disassembly of transmission coupling assembly 300, retainer 380 is accessed through interior space 386 and sufficiently compressed so that planet carrier 310 is no longer axially restrained relative to ring gear 350. Planet carrier 310 is axially displaced in direction 392 while ring gear 350 remains stationary relative to planet carrier 310 or is axially displaced in direction 390. In an alternative embodiment, ring gear 350 is axially displaced in direction 390 while planet carrier 310 remains stationary relative to ring gear 350. Axial displacement of planet carrier in direction 392 results in engagement features 314, 354 disuniting such that engagement features 314, 354 are no longer intermeshed.

While the embodiment of FIGS. 10-14 have described engagement features 354 of ring gear 350 including beveled surface 365, it is contemplated that engagement features 314 of planet carrier 310 may include a beveled surface similar to beveled surface 365 of ring gear 350. In such an embodiment, retainer 380 may be received and positioned within recess 368 of ring gear 350. An application of an assembly force to either of planet carrier 310 or ring gear 350 would result in compression and elastic deformation of retainer 380 as discussed previously herein.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transmission coupling assembly for transferring torque in a transmission from a first rotatable component to a second rotatable component, comprising:
a first operative transmission component configured to rotate about an axis and including a first body adapted to be coupled to the first rotatable component and a first engagement end defined by a first plurality of engagement features extending from the first body along and spaced apart from the axis, each of the first plurality of engagement features having a first radial exterior surface and a first radial interior surface opposite the first radial exterior surface, the first radial interior surface being positioned radially between the first radial exterior surface and the axis; and
a second operative transmission component configured to rotate about the axis and including a second body adapted to be coupled to the second rotatable component and a second engagement end defined by a second plurality of engagement features extending from the second body along and spaced apart from the axis, each of the second plurality of engagement features having a second radial exterior surface and a second radial interior surface opposite the second radial exterior surface, the second radial interior surface being positioned radially between the second radial exterior surface and the axis,
the second operative transmission component being operatively coupled to the first operative transmission component through an intermeshing of the second plurality of engagement features with the first plurality of engagement features,
wherein when intermeshed at least a first portion of the first radial exterior surface of each of the first plurality of engagement features positioned proximate to the second body of the second operative transmission component and at least a second portion of the second radial exterior surface of each of the second plurality of engagement features positioned proximate the first body of the first operative transmission component are accessible along a radial direction,
wherein each of the first engagement end and the second engagement end includes a plurality of scalloped recesses alternating with the respective first plurality of engagement features and second plurality of engagement features, each of the plurality of scalloped recesses extending axially away from the respective first plurality of engagement features and second plurality of engagement features along the axis.

2. The transmission coupling assembly of claim 1, further comprising a retainer cooperating with the first operative transmission component and the second operative transmission component to axially hold the first operative transmission component axially relative to the second operative transmission component, wherein a zone of engagement is defined by an axial overlap of the first plurality of engagement features with the second plurality of engagement features when intermeshed, the retainer engaging the first operative transmission component and the second operative transmission component in the zone of engagement.

3. The transmission coupling assembly of claim 2, wherein the retainer is received in a first recess in the first plurality of engagement features and in a second recess in the second plurality of engagement features.

4. The transmission coupling assembly of claim 2, wherein:
the first radial interior surface of the first plurality of engagement features includes a first recess; and
the second radial interior surface of the second plurality of engagement features is non-intersecting with the second radial exterior surface and each of the second plurality of engagement features includes a beveled surface positioned radially between the second radial exterior surface and the second radial interior surface, the second radial interior surface including a second recess arranged longitudinally of the beveled surface along the axis, the second recess generally aligned with the first recess, the retainer received in the first recess and the second recess.

5. The transmission coupling assembly of claim 1, wherein each of the first plurality of engagement features and the second plurality of engagement features have a longitudinal extent which extends parallel to the axis.

6. The transmission coupling assembly of claim 1, wherein when intermeshed at least a third portion of the first radial interior surface of each of the first plurality of engagement features positioned proximate to the second body of the second operative transmission component and at least a fourth portion of the second radial interior surface of each of the second plurality of engagement features positioned proximate the first body of the first operative component are accessible along the radial direction.

7. The transmission coupling assembly of claim 1, wherein the first plurality of engagement features and the second plurality of engagement features each comprise a straight-sided radial flank architecture.

8. The transmission coupling assembly of claim 7, wherein the straight-sided radial flank architecture of the first plurality of engagement features is sized and shaped to be generated by a hob.

9. The transmission coupling assembly of claim 8, wherein the straight-sided radial flank architecture of the second plurality of engagement features is sized and shaped to be generated by the hob.

10. The transmission coupling assembly of claim 1, wherein the first operative transmission component is one of a first sun gear, a first planet carrier, a first ring gear, a first clutch, and a first interconnector.

11. The transmission coupling assembly of claim 10, wherein the second transmission component is one of a second sun gear, a second planet carrier, a second ring gear, a second clutch, and a second interconnector.

12. A method of assembling a transmission coupling assembly for transferring torque in a transmission from a first rotatable component to a second rotatable component, the method comprising:
providing a first operative transmission component configured to rotate about an axis and including a first body adapted to be coupled to the first rotatable component and a first engagement end defined by a first plurality of engagement features extending from the first body along and spaced apart from the axis, each of the first plurality of engagement features including a first radial exterior surface and a first radial interior surface opposite the first radial exterior surface, the first radial interior surface being positioned radially between the first radial exterior surface and the axis, the first radial interior surface having a first recess;
providing a second operative transmission component configured to rotate about the axis and including a second body adapted to be coupled to the second rotatable component and a second engagement end defined by a second plurality of engagement features extending from the second body along and spaced apart from the axis, each of the second plurality of engagement features having a second radial exterior surface, a second radial interior surface opposite and non-intersecting with the second radial exterior surface and positioned radially between the second radial exterior surface and the axis, and a beveled surface positioned radially between the second radial exterior surface and the second radial interior surface, the second radial interior surface having a second recess, the beveled surface arranged longitudinally of the second recess along the axis;
placing a discontinuous annular retainer within the first recess;
placing the second engagement end of the second operative transmission component adjacent the first engagement end of the first operative transmission component;
aligning the second plurality of engagement features relative to the first plurality of engagement features, wherein the second plurality of engagement features are capable of intermeshing with the first plurality of engagement features when aligned;
applying a force along the axis to at least one of the first body of the first operative transmission component or the second body of the second operative transmission component such that the beveled surface of the second operative transmission component engages the discontinuous annular retainer; and
deforming the discontinuous annular retainer until the first recess and the second recess are aligned and the discontinuous annular retainer reforms and is positioned within the first recess and the second recess.

13. The method of claim 12, wherein the first plurality of engagement features and the second plurality of engagement features each comprise a straight-sided radial flank architecture.

14. The method of claim 13, wherein the straight-sided radial flank architecture of the first plurality of engagement features and the second plurality of engagement features is sized and shaped to be generated by a hob.

15. An operative transmission component for transferring torque, comprising:
a body rotatable about a longitudinal axis; and
a plurality of engagement features adjacent and extending from a first end of the body along the longitudinal axis, each of the plurality of engagement features including a radial exterior surface, a radial interior surface opposite and non-intersecting with the radial exterior surface and positioned radially between the radial exterior surface and the longitudinal axis, and a beveled surface intersecting one of the radial exterior surface or the radial interior surface,
wherein the first end of the body includes a plurality of scalloped recesses alternating with the plurality of engagement features, each of the plurality of scalloped recesses extending axially away from the plurality of engagement features along the longitudinal axis
wherein the plurality of engagement features comprise a straight-sided radial flank architecture.

16. The transmission component of claim 15, wherein the beveled surface intersects the radial interior surface.

17. The transmission component of claim 15, wherein each of the plurality of engagement features includes a recess, each of the respective recesses configured to receive a portion of an annular retainer.

18. The transmission component of claim 17, wherein the radial interior surface of each of the plurality of engagement features includes the recess, the recess positioned longitudinally from the beveled surface along the longitudinal axis.

19. A transmission coupling assembly for transferring torque in a transmission from a first rotatable component to a second rotatable component, comprising:
a first operative transmission component configured to rotate about an axis and including a first body adapted to be coupled to the first rotatable component and a first engagement end defined by a first plurality of engagement features extending from the first body along and spaced apart from the axis, each of the first plurality of engagement features having a first radial exterior surface and a first radial interior surface opposite the first radial exterior surface, the first radial interior surface being positioned radially between the first radial exterior surface and the axis; and a second operative transmission component configured to rotate about the axis and including a second body adapted to be coupled to the second rotatable component and a second engagement end defined by a second plurality of engagement features extending from the second body along and spaced apart from the axis, each of the second plurality of engagement features having a second radial exterior surface and a second radial interior surface opposite the second radial exterior surface, the second radial interior surface being positioned radially between the second radial exterior surface and the axis, the second operative transmission component being operatively coupled to the first operative transmission component through an intermeshing of the second plurality of engagement features with the first plurality of engagement features, wherein when intermeshed at least a first portion of the first radial exterior surface of each of the first plurality of engagement features positioned proximate to the second body of the second operative transmission component and at least a second portion of the second radial exterior surface of each of the second plurality of engagement features positioned proximate the first body of the first operative transmission component are accessible along a radial direction;

a retainer cooperating with the first operative transmission component and the second operative transmission component to axially hold the first operative transmission component axially relative to the second operative transmission component, wherein a zone of engagement is defined by an axial overlap of the first plurality of engagement features with the second plurality of engagement features when intermeshed, the retainer engaging the first operative transmission component and the second operative transmission component in the zone of engagement, the first radial interior surface of the first plurality of engagement features includes a first recess; and the second radial interior surface of the second plurality of engagement features is non-intersecting with the second radial exterior surface and each of the second plurality of engagement features includes a beveled surface positioned radially between the second radial exterior surface and the second radial interior surface, the second radial interior surface including a second recess arranged longitudinally of the beveled surface along the axis, the second recess generally aligned with the first recess, the retainer received in the first recess and the second recess.

20. A transmission coupling assembly for transferring torque in a transmission from a first rotatable component to a second rotatable component, comprising:

a first operative transmission component configured to rotate about an axis and including a first body adapted to be coupled to the first rotatable component and a first engagement end defined by a first plurality of engagement features extending from the first body along and spaced apart from the axis, each of the first plurality of engagement features having a first radial exterior surface and a first radial interior surface opposite the first radial exterior surface, the first radial interior surface being positioned radially between the first radial exterior surface and the axis; and a second operative transmission component configured to rotate about the axis and including a second body adapted to be coupled to the second rotatable component and a second engagement end defined by a second plurality of engagement features extending from the second body along and spaced apart from the axis, each of the second plurality of engagement features having a second radial exterior surface and a second radial interior surface opposite the second radial exterior surface, the second radial interior surface being positioned radially between the second radial exterior surface and the axis, the second operative transmission component being operatively coupled to the first operative transmission component through an intermeshing of the second plurality of engagement features with the first plurality of engagement features, wherein when intermeshed at least a first portion of the first radial exterior surface of each of the first plurality of engagement features positioned proximate to the second body of the second operative transmission component and at least a second portion of the second radial exterior surface of each of the second plurality of engagement features positioned proximate the first body of the first operative transmission component are accessible along a radial direction, wherein the first plurality of engagement features and the second plurality of engagement features each comprise a straight-sided radial flank architecture, wherein the straight-sided radial flank architecture of the first plurality of engagement features is sized and shaped to be generated by a hob.

21. The transmission coupling assembly of claim 20, wherein the straight-sided radial flank architecture of the second plurality of engagement features is sized and shaped to be generated by the hob.

* * * * *